(12) United States Patent
Kuhn

(10) Patent No.: US 12,448,944 B2
(45) Date of Patent: Oct. 21, 2025

(54) ENERGY GENERATING DEVICE

(71) Applicant: Harald Kuhn, Cloppenburg (DE)

(72) Inventor: Harald Kuhn, Cloppenburg (DE)

( * ) Notice: Subject to any disclaimer, the term of this patent is extended or adjusted under 35 U.S.C. 154(b) by 112 days.

(21) Appl. No.: 18/550,911

(22) PCT Filed: Mar. 16, 2022

(86) PCT No.: PCT/EP2022/056897
§ 371 (c)(1),
(2) Date: Nov. 13, 2023

(87) PCT Pub. No.: WO2022/194972
PCT Pub. Date: Sep. 22, 2022

(65) Prior Publication Data
US 2024/0191683 A1 Jun. 13, 2024

(30) Foreign Application Priority Data
Mar. 17, 2021 (DE) ...................... 10 2021 106 494.5

(51) Int. Cl.
*F03B 17/06* (2006.01)
*F03B 5/00* (2006.01)
(Continued)

(52) U.S. Cl.
CPC .............. *F03B 17/062* (2013.01); *F03B 5/00* (2013.01); *F03B 15/02* (2013.01); *F03B 11/002* (2013.01);
(Continued)

(58) Field of Classification Search
CPC .......... F03B 17/062; F03B 5/00; F03B 15/02; F03B 11/002; F03B 11/02; F03B 15/005;
(Continued)

(56) References Cited

U.S. PATENT DOCUMENTS 4,084,102 A * 4/1978 Fry .................... F03D 13/20
244/33
4,166,596 A * 9/1979 Mouton, Jr. ............ F03D 9/25
244/33
(Continued)

FOREIGN PATENT DOCUMENTS

DE 10-2013-205781 A1 10/2014
FR 2968726 A1 6/2012
(Continued)

*Primary Examiner* — Pedro J Cuevas
(74) *Attorney, Agent, or Firm* — Seed Intellectual Property Law Group LLP

(57) ABSTRACT

An energy generating device for generating energy from a flowing fluid, especially from a wind flow and/or from a water flow, comprises: a rotation body, the rotation body extending along an axis of rotation between a first point and a second point and the rotation body being adapted to rotate about the axis of rotation and the rotation body being formed from at least a first, a second, and a third rotation segment, wherein the rotation segments are joined together and arranged along the axis of rotation, and they form a region at least partly surrounded by fluid, wherein the second rotation segment is situated between the first and the third rotation segment and has a different diameter than the first and third rotation segment; and a generator device mechanically connected to the rotation body, wherein the generator device is adapted to generate energy which is produced from the rotation of the rotation body.

16 Claims, 10 Drawing Sheets

(51) Int. Cl.
*F03B 11/00* (2006.01)
*F03B 11/02* (2006.01)
*F03B 15/00* (2006.01)
*F03B 15/02* (2006.01)

(52) U.S. Cl.
CPC ............ *F03B 11/02* (2013.01); *F03B 15/005* (2013.01); *F05B 2240/201* (2013.01); *F05B 2240/312* (2013.01); *F05B 2240/98* (2013.01)

(58) Field of Classification Search
CPC .. F03B 3/08; F05B 2240/312; F05B 2240/98; F05B 2250/311
See application file for complete search history.

(56) References Cited

U.S. PATENT DOCUMENTS

| | | | | |
|---|---|---|---|---|
| 4,285,481 | A * | 8/1981 | Biscomb | F03D 9/255 244/33 |
| 4,470,563 | A * | 9/1984 | Engelsman | F03D 13/20 244/33 |
| 4,659,940 | A * | 4/1987 | Shepard | F03D 13/20 416/85 |
| 4,748,808 | A * | 6/1988 | Hill | F03B 17/063 416/85 |
| 5,406,190 | A * | 4/1995 | Rosenberg | H02P 9/46 322/29 |
| 5,642,984 | A * | 7/1997 | Gorlov | F03D 3/02 416/DIG. 6 |
| 6,097,104 | A * | 8/2000 | Russell | F03D 9/25 290/55 |
| 6,155,892 | A * | 12/2000 | Gorlov | F03D 9/32 440/9 |
| 6,172,429 | B1 * | 1/2001 | Russell | F03D 13/20 290/55 |
| 6,293,835 | B2 * | 9/2001 | Gorlov | F03B 3/00 440/8 |
| 6,808,366 | B2 * | 10/2004 | Sikes | F03D 3/02 415/60 |
| 6,910,873 | B2 * | 6/2005 | Kaliski | F03D 7/06 416/169 R |
| 7,335,000 | B2 * | 2/2008 | Ferguson | F03D 13/20 416/4 |
| 7,358,623 | B2 * | 4/2008 | Richards | H02K 7/183 290/55 |
| 7,362,004 | B2 * | 4/2008 | Becker | F03D 9/11 290/55 |
| 7,425,776 | B2 * | 9/2008 | Ketcham | F03D 3/005 290/55 |
| 7,602,077 | B2 * | 10/2009 | Ferguson | F03D 3/062 290/55 |
| 7,652,388 | B2 * | 1/2010 | Lyatkher | F03B 17/063 290/55 |
| 7,741,729 | B2 * | 6/2010 | Lyatkher | F03B 13/264 290/55 |
| 7,775,761 | B2 * | 8/2010 | Ferguson | F03D 3/002 416/4 |
| 7,859,126 | B2 * | 12/2010 | Ferguson | F03D 9/25 416/4 |
| 8,047,785 | B2 * | 11/2011 | Lyatkher | F03B 17/063 416/85 |
| 8,148,838 | B2 * | 4/2012 | Ferguson | F03D 3/062 290/55 |
| 8,247,912 | B2 * | 8/2012 | Da Costa Duarte Pardal | F03D 80/30 290/55 |
| 8,358,030 | B2 * | 1/2013 | Plaskove | F03D 3/02 290/55 |
| 8,419,346 | B2 * | 4/2013 | Attey | F03D 3/062 416/182 |
| 8,436,483 | B2 * | 5/2013 | Perner | F03D 15/20 290/44 |
| 8,497,594 | B2 * | 7/2013 | Rajadhyaksha | F03B 17/063 290/53 |
| 8,525,363 | B2 * | 9/2013 | Rajadhyaksha | F03B 17/062 290/53 |
| 8,674,535 | B2 * | 3/2014 | Arlitt | F03B 13/10 290/43 |
| 8,786,122 | B2 * | 7/2014 | Rajadhyaksha | F03B 17/063 290/53 |
| 8,981,585 | B2 * | 3/2015 | Soong | F03B 13/10 290/54 |
| 9,000,605 | B2 * | 4/2015 | Glass | F03D 9/32 244/30 |
| 9,133,822 | B2 * | 9/2015 | Tang | F03D 9/34 |
| 9,618,002 | B1 * | 4/2017 | Cabra | F03B 13/00 |
| 10,148,090 | B2 * | 12/2018 | Gillett | H02J 3/30 |
| 10,724,502 | B2 * | 7/2020 | Moore | F03D 7/06 |
| 10,938,274 | B2 * | 3/2021 | Sauchyn | F03B 13/264 |
| 11,149,710 | B2 * | 10/2021 | Bishop | F03D 3/064 |
| 2003/0209911 | A1 * | 11/2003 | Pechler | F03D 3/02 290/55 |
| 2006/0251505 | A1 * | 11/2006 | Ferguson | F03D 13/20 415/4.1 |
| 2007/0176432 | A1 * | 8/2007 | Rolt | F03D 9/255 290/55 |
| 2008/0048453 | A1 * | 2/2008 | Amick | F03D 1/04 290/55 |
| 2008/0121444 | A1 * | 5/2008 | Bauer | B60L 50/13 307/31 |
| 2008/0181773 | A1 * | 7/2008 | Ferguson | F03D 3/062 416/9 |
| 2008/0296905 | A1 | 12/2008 | Ferguson | |
| 2009/0091134 | A1 * | 4/2009 | Lyatkher | F03B 13/20 290/43 |
| 2009/0278353 | A1 * | 11/2009 | Da Costa Duarte Pardal | F03D 15/10 290/55 |
| 2009/0285689 | A1 * | 11/2009 | Hall | F03D 3/061 416/197 A |
| 2010/0032947 | A1 * | 2/2010 | Bevirt | F03D 1/065 290/55 |
| 2010/0032963 | A1 * | 2/2010 | Ferguson | F03D 3/062 290/55 |
| 2010/0052325 | A1 * | 3/2010 | Perner | F03B 11/06 290/55 |
| 2010/0090466 | A1 * | 4/2010 | Lyatkher | F03D 3/061 416/176 |
| 2010/0109325 | A1 * | 5/2010 | Hupe | H02P 4/00 290/31 |
| 2011/0109097 | A1 * | 5/2011 | Ferguson | F03D 9/25 290/55 |
| 2011/0121578 | A1 * | 5/2011 | Ferguson | F03D 13/20 290/55 |
| 2012/0235418 | A1 * | 9/2012 | Plaskove | F03D 3/02 290/55 |
| 2013/0009469 | A1 * | 1/2013 | Gillett | H02J 3/381 307/25 |
| 2013/0026761 | A1 * | 1/2013 | Rajadhyaksha | F03B 17/062 416/128 |
| 2013/0026762 | A1 * | 1/2013 | Rajadhyaksha | F03B 17/063 290/54 |
| 2013/0214533 | A1 * | 8/2013 | Hupe | F03B 15/06 290/43 |
| 2014/0161642 | A1 * | 6/2014 | Rajadhyaksha | F03B 17/063 417/334 |
| 2014/0167417 | A1 * | 6/2014 | Tang | F24S 60/30 52/173.3 |
| 2014/0246862 | A1 * | 9/2014 | Garcia-Sanz | F03D 13/20 290/55 |
| 2014/0374537 | A1 * | 12/2014 | Anderson | G01W 1/08 244/33 |
| 2014/0377066 | A1 * | 12/2014 | Anderson | F03D 1/065 416/31 |
| 2016/0169197 | A1 | 6/2016 | Mak | |
| 2018/0280849 | A1 * | 10/2018 | Abahusayn | B64B 1/50 |
| 2019/0293051 | A1 * | 9/2019 | Bishop | F03D 13/10 |

(56) References Cited

U.S. PATENT DOCUMENTS

2021/0115891 A1* 4/2021 Snisar .................. F03D 1/0625
2022/0403807 A1* 12/2022 Cummings ............. F03B 3/145
2024/0183330 A1* 6/2024 Cummings ............. F03B 3/145

FOREIGN PATENT DOCUMENTS

WO    WO 2013056322 A1    4/2013
WO    WO 2018112530 A1    6/2018
WO    WO-2021112993 A1 *    6/2021    .............. F03B 13/06

* cited by examiner

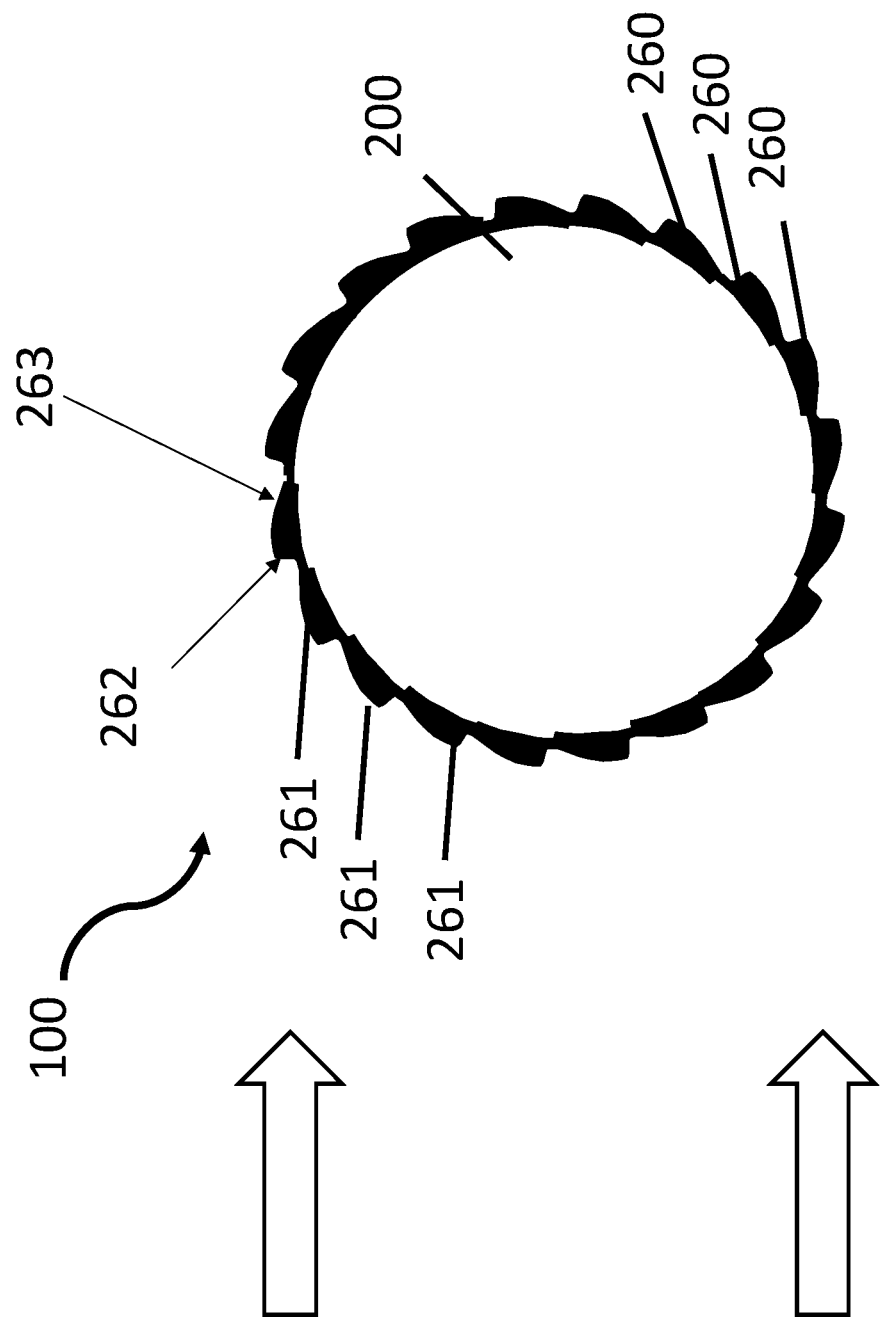

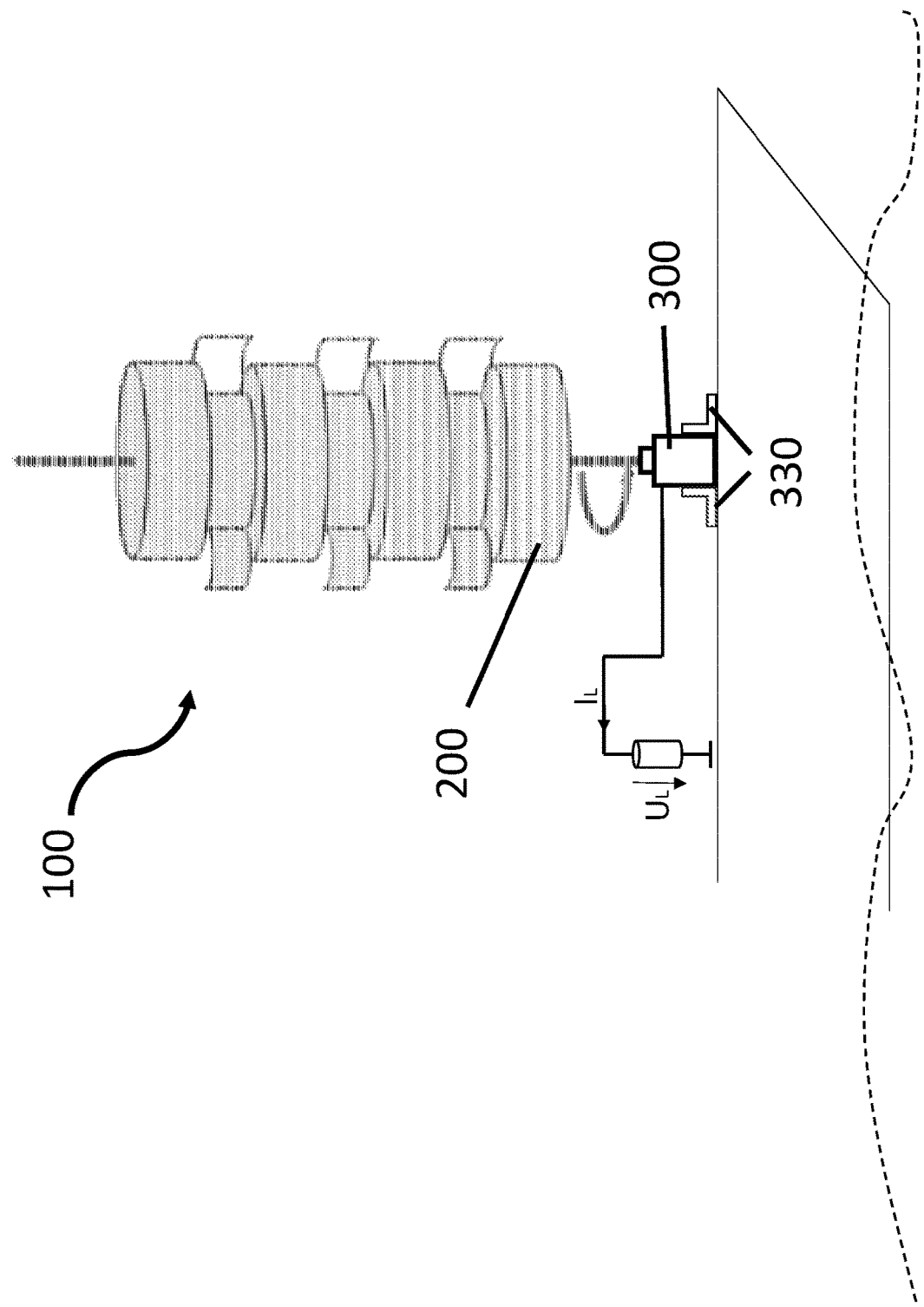

ENERGY GENERATING DEVICE

BACKGROUND

Technical Field

Embodiments of the present invention deal with an energy generating device for generating energy from a flowing fluid, especially from a wind flow and/or from a water flow. Furthermore, embodiments of the present invention relate to a rotation body for an energy generating device.

Description of the Related Art

Energy generating devices are known in many forms and variants, based on different fundamental principles. For example, wind power plants or wind turbines are known in various forms, generating energy from flowing wind in the form of electric power or in the form of a driving force for propulsion. In addition, hydroelectric power plants are also known in various forms, generating energy from flowing water, for example from a river or ocean current.

Such regenerative energy systems which generate energy from regenerative energy sources are used in many different places and for various application purposes.

For example, large power plants are known for large industrial energy generation, as well as small power plants, which are used for example to charge mobile energy storages or to generate light, and so forth.

One special usage location for such energy generating plants is ships or boats. By their nature, it is often windy aboard them, and the air is in many locations heated by solar radiation.

It may be necessary to generate energy aboard sailboats, and small wind turbines are also known for such purposes.

The problem with known small wind turbines is that they are usually hard to transport. In addition, every wind turbine loses its ability to generate energy when the wind is calm.

For this area of application, it would be desirable to provide a multifunction plant, for example, for outdoor activities or shipboard applications, with which not only a wind flow, but also another fluid flow can be utilized, such as a water flow. In other words, the broadest possible area of application is thus desirable.

The German Patent and Trademark Office has found the following prior art in the priority application: DE 10 2013 205 781 A1 and FR 2 968 726 A1. Document DE 10 2013 205 781 A1 relates to a wind power plant which can be placed in up and down movement by a buoyancy body by which energy for generating electric energy can be transferred to a generator device of a plant portion situated on the floor. Document FR 2 968 726 A1 relates to a wind power plant with inflatable paddles.

BRIEF SUMMARY

A problem addressed by embodiments of the present invention is to improve the prior art, or to offer an alternative to those already known. In particular, some embodiments provide for an energy generation plant which is easy to handle and transport, besides having a broad area of application.

Some embodiments include an energy generating device and/or an energy generating device for generating energy from a flowing fluid.

Thus, an energy generating device is proposed which converts stored potential energy from a flowing fluid into another form of energy, such as electric energy or a driving energy or a propulsion force. The fluid can be gaseous or liquid. Preferably, energy is obtained from a wind flow and additionally or alternatively from a water flow. Further preferably, the energy is generated in the form of an electric energy, but energy can also be produced additionally in the form of a propulsion energy, for example in order to propel a ship or boat.

Furthermore, it is proposed that the energy generating device comprises at least one rotation body, the rotation body extending along an axis of rotation between a first point and a second point and the rotation body being designed to rotate about the axis of rotation.

It is thus proposed that the rotation body extends spatially along an axis of rotation, where the first and the second point are to be considered as different points in space. The rotation body accordingly extends along a distance and is rotatably mounted. The rotation body for example is configured as an elongated cylinder, which is designed to rotate about the axis of rotation.

The axis of rotation can have different configurations, for example the axis can be situated horizontally or vertically and it may be different depending on the place of use of the energy generating device. For example, the energy generating device in a stand operation can have a vertical axis of rotation. In another example, the energy generating device can have a horizontal axis in a flying operation or water operation.

In one preferred embodiment, the rotation body comprises bearing means for a rotational mounting of the rotation body about the axis of rotation. For example, the rotation body can be mounted by sliding bearing or ball bearing with a shaft for rotational mounting of the rotation body about the axis of rotation.

The shaft in an especially preferred embodiment is designed as a standing shaft or as a rotating shaft and is mechanically connected to the rotation body, for example, firmly or through a bearing means.

Furthermore, it is proposed that the rotation body is formed from at least a first, a second, and a third rotation segment, the rotation segments being connected to each other and arranged along the axis of rotation, and forming a region at least partly surrounded by fluid.

It is thus proposed that the rotation body is formed from at least three or more or a plurality of rotation segments.

The rotation segments are joined together, namely, preferably directly adjacent to each other. For example, the rotation segments can be mechanically joined together by a separation barrier, so that each or several of the rotation segments forms a closable and gas-tight air or gas chamber, holding gas enclosed in the rotation segments. The rotation segments are preferably formed bonded or welded. When other materials are used, the connection of the segments is stable.

The rotation segments are arranged along the axis of rotation, thus also for example being arranged with rotation symmetry next to each other and being mechanically connected, so that the plurality of rotation segments forms the shape of the rotation body, which can be cylindrical, for example. A glue bonding or a welding is preferably proposed as the mechanical connection.

With this arrangement, the rotation segments form a region at least partly surrounded by fluid.

The region surrounded by fluid is a region on a surface of the rotation body or on the surface of the rotation segments where the fluid comes into contact with the surface and flows along it. Thus, in other words, a region in which the fluid strikes the surface of the rotation segments or comes into contact with the surface and forms a partial or complete flow around the cylindrical rotation body.

Furthermore, it is proposed that the second rotation segment is situated between the first and the third rotation segment and the second rotation segment has a different diameter than the first and third rotation segment. It is thus proposed that at least the second rotation segment has a different diameter than the first or third rotation segment, which are arranged adjacent to the second rotation segment.

Thus, a particular form of the rotation body is proposed, resulting from a changing of the rotation segments arranged adjacent to each other on account of different diameter along the axis of rotation of the rotation segments.

It has been discovered that the proposed particular form provides certain advantageous properties for the rotation body, namely for example that an aerodynamic reefing of the rotation body is possible.

Reefing is the process of reducing the surface of the rotation body so as to form a smaller surface of attack for the fluid flowing around it.

Furthermore, it has been discovered that the shape or the different diameters of the rotation segments can lead to an improved movement stability and produce an increased region surrounded by fluid, thereby increasing the energy yield.

Furthermore, a generator device mechanically connected to the rotation body is proposed, the generator device being adapted to generate energy obtained from rotation of the rotation body, for example electric energy, thermal energy, or driving energy.

It is thus proposed to use a generator for generating energy, being connected to the rotation body. The generator can comprise, for example, a rotating part and a fixed part, known as the rotor and the stator.

The mechanical connection of the generator can have different configurations, for example a direct connection to the rotation body, where the rotation body is mechanically coupled to the rotor of the generator or the rotation body forms the rotor.

In an especially preferred embodiment, the generator is adapted to generate electric energy, for example being designed as a permanently excited alternating current generator, preferably generating electric energy in the form of a power per unit of time in a power range of 1 W to 50 kW. This power range will be dimensioned larger accordingly when the energy generating device is used as a large wind turbine.

In another especially preferred embodiment, the generator is designed as an internal rotor or an external rotor and comprises electrical connection means to produce an electrical connection with an electrical consumer or an electrical storage, and to consume or store the energy so generated.

The proposed concept can basically also be scaled to higher power regions, taking into account the physical limits. The concept in a proposed embodiment is proposed as a small generator, for example in order to operate electrical consumers or to charge electrical storages, such as mobile telephones, radios, LED lighting, power banks, water boilers. The area of application is thus expanded.

The rotation segments are preferably cylindrical or annular in shape, i.e., designed as a disc with a disc thickness or as a hollow cylinder.

The rotation segments preferably enclose in their interior a spatial volume which is filled for example with air or helium and in this form they consist of hollow spaces. The rotation segments can likewise be formed from elastically deformable materials, such as elastic-shape polymers or origami-like folded fabric. The rotation segments can be self-supporting or be braced by a supporting structure, thus for example being formed as a gas-filled film cylinder.

In one especially preferred embodiment, the rotation segments are made from at least one tear-proof and thin-layered plastic film, in order to provide an especially light rotation body.

In another embodiment, the rotation segments can be completely or partially connected to each other in a gas-conducting manner, so that accordingly all the rotation segments are connected to each other or only some of them are connected to each other.

Preferably the first rotation segment has a first diameter, the second rotation segment has a second diameter and the third rotation segment has a third diameter, wherein the first diameter is larger than the second diameter and the third diameter corresponds to the first diameter, especially so as to form a cylinder-shaped tree cake form of the rotation body. Such a shape of the rotation body where the diameter of adjacent rotation segments changes repeatedly is known as a tree cake shape or, in the case of three rotation segments, a dumbbell shape. Thus, a kind of wavy shape is produced along the stretch between the first and the second point of the rotation body, having peaks and valleys and resulting from a changing of diameter of the rotation segments, which are in the shape of a ring or a disc, for example. Thanks to this shape, an especially simple and aerodynamic reefing is possible, since the rotation segments with a larger diameter bear against rotation segments with a smaller diameter, thus diminishing folds of the rotation segments, which are detrimental to an aerodynamic shape. Furthermore, thanks to the changing sequence of diameters, the energy generating device is more stable in the fluid than, for example, a simple cylinder without the changing sequence of diameters, on account of the special tree cake shape.

In addition or alternatively it is proposed that the first diameter is smaller than the second diameter and the third diameter corresponds to the first diameter, especially so as to form an elliptical shape or flat diamond shape of the rotation body. Such a shape of the rotation body in which the diameter diminishes from the middle of the rotation body to the outside is called an elliptical shape or diamond shape, the elliptical shape also being called a spherical shape or round shape, and the diamond shape being called a triangle shape. Thus, depending on the number of rotation segments along the stretch between the first and the second point of the rotation body, an elliptical shape or a flat diamond shape is produced. The diameter of the rotation body thus at first increases along the stretch between the first and the second point, namely, until reaching the second rotation element, and then it decreases once more.

In addition or alternatively it is proposed that the first diameter is larger than the second diameter and the second diameter is larger than the third diameter, especially so as to form a conical shape of the rotation body. Thus, the diameter of the rotation body increases or decreases in one direction, depending on the orientation of the rotation body. The conical shape can also be called a trapezoid shape. Thanks to the conical shape, the center of gravity of the rotation body will lie in a predetermined place. For example, the center of gravity can thus be set in a stand operation of the energy generating device to lie close to the floor, so that the device has a more stable stand.

It is understood in all previously described cases that the shape of the rotation body is dependent on the number of rotation elements and that mixed forms can also be realized.

In addition or alternatively it is proposed that the rotation segments are shaped as rings, especially so that the rotation body is hollow and there is formed an open barrel shape, wherein the ring-shaped rotation segments are mounted by a supporting structure for fastening the rotation body to a rotating axis. It is thus proposed to form the rotation segments as rings to save on weight and for easier transporting. Of course, a supporting structure of beam elements is provided for the rotational mounting of the rotation body.

In an especially preferred embodiment, the rotation body or the rotation segments are formed such that the rotation body has a substantially elongated cylinder shape.

Preferably it is proposed that the rotation body is formed from more than five rotation segments, preferably from more than 10 rotation segments, each time directly adjacent rotation segments having a different diameter, for example in order to form one of the previously described shapes of the rotation body. It is thus proposed in preferable manner to use a plurality of rotation segments in a row, where each of the directly adjoining rotation segments have a different diameter. For example, nine rotation segments can be used, where a first, third, fifth, seventh and ninth rotation segment have the same first diameter and the second, fourth, sixth, and eighth rotation segment have the same second diameter, which is smaller than the first diameter. Thus, the alternating change in diameter of the cylindrical rotation segments produces a tree cake form.

Preferably it is proposed that the rotation body is formed as self-starting. Self-starting is to be understood as meaning that the rotation body can pass from standstill to a rotational state with no additional drive or force action, the rotational state being produced by the fluid flowing along the region surrounded by fluid.

In one preferred embodiment, at least one rotation segment comprises at least two starting elements situated opposite in relation to the axis of rotation for increasing the fluid resistance in the region surrounded by fluid. It is thus proposed that at least one of the rotation segments comprises at least two means for increasing the fluid resistance of the rotation body. The fluid resistance can also be called the flow resistance.

The starting element comprises in another embodiment one side facing the fluid and one side facing away from the fluid, the side facing the fluid having a larger fluid resistance than the side facing away from the fluid. It is thus proposed to fashion the starting means such that a self-starting is even possible when the fluid is flowing evenly along the region surrounded by fluid both on a top side and on a bottom side of the rotation body.

For example, the starting elements can be paddle or wing shapes, having an approximately concave side facing the fluid and an approximately convex side facing away from the fluid, and be fashioned as wings, tabs, or some other kind of device.

In an especially preferred embodiment, at least one rotation segment comprises a plurality of starting elements arranged over the entire circumference of the at least one rotation segment, such as two or more starting elements. With a plurality of starting elements, the shape of the rotation segments or the rotation segment will be substantially circular and in particular the Magnus effect can be utilized more efficiently. But also multiple rotation segments or all rotation segments can have a plurality of starting means.

Preferably it is proposed that the rotation body is reefable. This is achieved in one preferred embodiment in that at least one of the rotation segments is gas-filled and in an internal region of the at least one gas-filled rotation element it has a larger pressure in the unreefed state than the ambient pressure, and a reefing is produced by a gas exchange. It is thus proposed to generate a larger pressure inside the rotation segments than an outside atmospheric pressure in the area of use of the energy generating device. In this way, the rotation body is self-supporting. A reefing can then be done, for example, by filling the individual rotation segments with a gas through one or more valves, in particular with compressed air of helium. The self-supporting design of the rotation body is especially advantageous in terms of the transporting of the energy generating device, since for example the gas can easily be vented from the rotation segments in order to compress the energy generating device and transport it in a small volume. Thanks to the possibility of admitting or releasing gas, the rotation body can thus be reefed and is accordingly reefable in design.

In an additional or alternative embodiment, the rotation body is designed for reefing in that at least one of the rotation segments is filled with a memory foam, which is uncompressed in an unreefed state and which strives to take up the uncompressed state when a force is acting upon the memory foam, especially by a reefing means. In this way, the rotation body is self-supporting. A reefing can then occur, for example, in that the elastic memory foam is compressed with a reefing means, and when no further reefing is desired the memory foam returns to its previous shape. In one example, the memory foam can be compressed like a sponge by force acting upon it and when the force action is again released the sponge or the memory foam unfolds once again.

In an additional or alternative embodiment, the rotation body is designed for reefing in that at least one of the rotation segments is formed with a foldable and elastic lattice structure, which is uncompressed in an unreefed state and which strives to take up the uncompressed state when a force is exerted on the lattice structure, especially by a reefing means. In this way, the rotation body is self-supporting. A reefing can then occur, for example, in that the lattice structure is compressed with a reefing means, and when no further reefing is desired the memory foam returns to its previous shape. The foldable lattice structure can also be viewed as an origami-like structure. In other rotation bodies formed with visco-foam or memory foam, the segments are reversibly and repeatedly reefed by compression.

It is understood that a reefing with a memory foam and additionally or alternatively with the lattice structure can also be brought about when the two materials strive to take up a compressed state. The at least one rotation segment is then tensioned with a tensioning means and the rotation segment is again compressed by loosening the tensioning means. A reefing can likewise be accomplished in this way Preferably it is further proposed that the rotation body comprises a reefing means with which the region surrounded by fluid of the gas-filled rotation segments is adjustable. It is thus proposed that the region surrounded by fluid can be decreased, for example before the operation or during the operation of the energy generating device. As previously described, reefing is the process by which the surface of the rotation body can be decreased, in order to present a smaller surface of attack to the fluid flowing around it. In this way, the energy generating device can be advantageously adapted to the current conditions and flow velocities of the fluid, and for example the energy generating device can also be operated during a storm or in very strong water currents. The reefing means can also be a tensioning means with which a reefing is brought about, as described above.

Preferably, a mechanical connecting means is proposed as the reefing means, being adapted to connect mechanically the first and the third rotation segment. The mechanical connecting means can be designed for example as a button system, hook system or tab system, producing a mechanical connection between the first and the third rotation segment.

In addition or alternatively, a traction system is proposed as the reefing means, being adapted to compress at least one of the gas-filled or material-filled rotation segments along the axis of rotation by means of a traction force. It is thus proposed to change the length of the rotation segments by a system working with a traction system and arranged on or inside the rotation body. The traction cable system is preferably designed as a cable pull system or as a rod system or as a hydraulic system, or as an electrical system. For example, the cable pull system is designed as a driven cable winch, which winds up or pays out a cable element, one end of the cable element being fastened to a rotation segment. The advantage with this kind of reefing is that a reefing is possible in a remote operation.

In one particular embodiment, the traction system is adapted to be operated remotely, and it has a receiver for this purpose.

In addition or alternatively, a valve system is proposed as the reefing means, being adapted to bring about a changing of the region surrounded by fluid by means of admitting or venting a gas from the gas-filled hollow space or from the memory foam.

In one particular embodiment, the valve system comprises an excess pressure release, in order to automatically vent the gas when a certain excess pressure is present.

All of the proposed reefing means can be combined with each other, for example the gas can be vented from the second rotation segment by the valve system and the first and the third rotation segment can be mechanically connected to the mechanical connecting means. If the mechanical connecting means are designed for example as snap buttons, a closing of the snap buttons can be accomplished with an additional traction system.

Preferably it is proposed that at least one of the rotation segments is filled with a gas the density of which is less than that of air, in order to generate a lifting force of the rotation body and establish a flying operation. In one preferred embodiment, the gas used is helium. It is thus proposed that the rotation segments are filled in their interior space with a lift-generating gas and can then be utilized with a corresponding suspension and a cable system in a flying operation.

In another especially preferred embodiment, the rotation body comprises a suspension, to which a cable system can be fastened in order to establish a flying operation, having in particular an electrical conductor through the cable system in order to drain off electric energy in the form of a current and/or a voltage, or the rotation body is used as a propulsion system in order to tow a ship by a connection element. The cable system is designed for example as a combined tear-resistant cable or as two or more independently fastened tear-resistant cables.

Preferably it is further proposed that at least one of the rotation segments is inflatable. It is proposed that a gas can be introduced into at least one rotation segment.

In one preferred embodiment it is proposed to provide an inflatability in that at least one rotation segment, especially all rotation segments, has a valve for admitting and discharging a gas, especially for admitting and discharging air or helium. Accordingly, it is proposed that gas can be admitted into or discharged from each rotation segment by a valve. For example, if all the rotation segments are connected, only one valve can be provided. If the rotation segments are only partly connected to exchange gas, several valves will be provided accordingly.

Preferably it is proposed that the components of the rotation body are designed such that a flying operation and a water operation can be established with the rotation body, for which purpose the rotation segments of the rotation body are made of durable lightweight material, such as a thin-wall plastic film for the flying operation or a similar durable and tear-proof material. It is thus proposed to configure the components as light as possible and weather-proof.

In addition or alternatively it is proposed that the generator device is encapsulated, i.e., it is designed waterproof or water-tight. It is thus proposed to also configure the energy generating device to be water-tight. This advantageously opens up a broad range of applications and provides its use during rain, above or on the water.

Preferably it is proposed that a fluid tracking device is provided, which is adapted to make the rotation body track a variable fluid flow. Thus, it is proposed to employ a tracking system to make the energy generating device or the rotation body track a variable fluid flow, such as a variable wind direction. In addition or alternatively it is proposed that a stabilization device is provided, which is adapted to maintain the rotation body stable in motion in the fluid flow. A particularly simple form of a stability and fluid tracking device can be, for example, a tail or a rudder provided on the energy generating device, as is known for example with kites.

Preferably it is proposed that the generator device comprises a rotating part and a stationary part, wherein the rotating part is mechanically connected to the rotation body and the stationary part comprises fastening means for securing to a floor structure or to a cable system, consisting for example of one, two, or more cables. Accordingly, it is proposed that the rotating part of the generator device is formed directly with the rotating rotation body or the rotation body forms the rotor of the generator and produces a mechanical unit. Thus, a fastening element is provided on the generator, making possible a stand operation or being provided for flight or water operation.

In an especially preferred further embodiment, a fastening means for securing to a floor structure or to a cable system is arranged on the rotation body.

In addition or alternatively it is proposed that the generator device is mechanically connected by a traction cable system to the rotation body in order to produce electric energy from a lifting force and additionally or alternatively to produce propulsive force produced by the rotation of the rotation body. Accordingly, it is proposed to design the rotation body and the generator device separately from each other and to connect them by a cable system. It is proposed to utilize the Magnus effect, which generates an upward directed lifting force by the rotation of the rotation body, for example when wind strikes the rotation body frontally. This upward directed force can be utilized for energy generation by a cable system connected to the generator device. If the cable is completely unwound a reefing will occur, resulting in the system dropping and the process can be started all over again. It is thus proposed to use the energy generating device as a towing kite with one cable or multiple cables, being attached to the generator device. Furthermore, a suspension or stowing device is provided to accommodate the rotation body for the flying operation.

Preferably it is proposed that the generator device is permanently excited in design and is adapted to put out a generated current to an electrical terminal, and the generator is preferably designed in a further preferred embodiment as an external rotor.

Preferably it is further proposed that the rotation body comprises a rotation generating means for placing or keeping the rotation body in a predetermined rotation about the rotation body, where the rotation generating means is adapted to bring about a rotational angular momentum of the rotation body. Thus, a means of propulsion is proposed which is adapted to keeping the rotation body in a predetermined rotation or accelerating it. This is based on the knowledge that the Magnus effect can be effectively utilized for production energy with a certain speed of rotation.

In one preferred embodiment, the rotation generating means is designed as a directional nozzle, which releases a generated excess pressure from an internal region of a rotation segment. Thus, it is proposed that a nozzle is arranged on the surface of the rotation segment, which produces an angular momentum pointing in a desired direction when the gas flows out from the interior of the rotation segment.

In addition or alternatively, the rotation generating means is designed as a compressed air nozzle, which drives the rotation body mechanically with a generated excess pressure. Thus, it is proposed that a compressed air nozzle be used to place the rotation body in rotation, while the drive unit with the compressed air nozzle can have various configurations. For example, an impeller can be driven with the compressed air nozzle, being mechanically coupled to the rotation body, so that the impeller produces an angular momentum on the rotation body.

In a further embodiment it is further proposed that the generated excess pressure is generated with a compressed air generating unit, for example with a compressed air cylinder or a compressor. In this case, the compressed air generating unit is connected to the rotation generating means by a compressed air line, especially when it is designed to be operated by compressed air.

In a further preferred embodiment it is proposed that the generated excess pressure is generated with a compressed air cylinder.

In addition or alternatively it is proposed that the generated excess pressure is generated with a solar pressure generating unit, which produces an excess pressure by heating, wherein ambient air flowing into an internal region of the rotation segments is heated.

For this purpose, it is proposed in another particular embodiment that the rotation body or the rotation segments are formed with a transparent film, in order to introduce light in an internal region of the rotation body or of one or more rotation segments, and wherein a light-absorbing region is provided in the internal region, which absorbs the light so introduced and becomes heated, and ambient air flows from an inlet to an outlet along the light-absorbing region in order to produce the excess pressure by an expansion of the ambient air due to heating in the internal region of the rotation body. Thus, it is proposed to also utilize solar thermal effects for the pressure generation.

Moreover, in another embodiment a rotation body is proposed for an energy generating device for generating energy from a flowing fluid, especially from a wind flow and additionally or alternatively from a water flow, wherein the rotation body extends along an axis of rotation between a first point and a second point and the rotation body is shaped as a cylinder and the rotation body is formed from at least a first, a second, and a third rotation segment, wherein the rotation segments are joined together and arranged along the axis of rotation, and they form a region at least partly surrounded by fluid, wherein the second rotation segment is situated between the first and the third rotation segment and has a different diameter than the first and third rotation segment, especially in order to form a cylinder-shaped tree cake form or a spherical shape or a conical shape of the rotation body.

In one preferred embodiment, the rotation body is configured according to one of the preceding embodiments.

BRIEF DESCRIPTION OF THE SEVERAL VIEWS OF THE DRAWINGS

Embodiments will now be explained with reference to the accompanying figures, where the same reference numbers are used for the same or similar subassemblies.

FIGS. 4A and 4B show schematically in a side view and in a perspective view an energy generating device having a plurality of starting elements.

FIGS. 5A, 5B, and 5C show schematically an energy generating device in a stand operation, in a water operation and in a flying operation.

DETAILED DESCRIPTION

Figure 1:
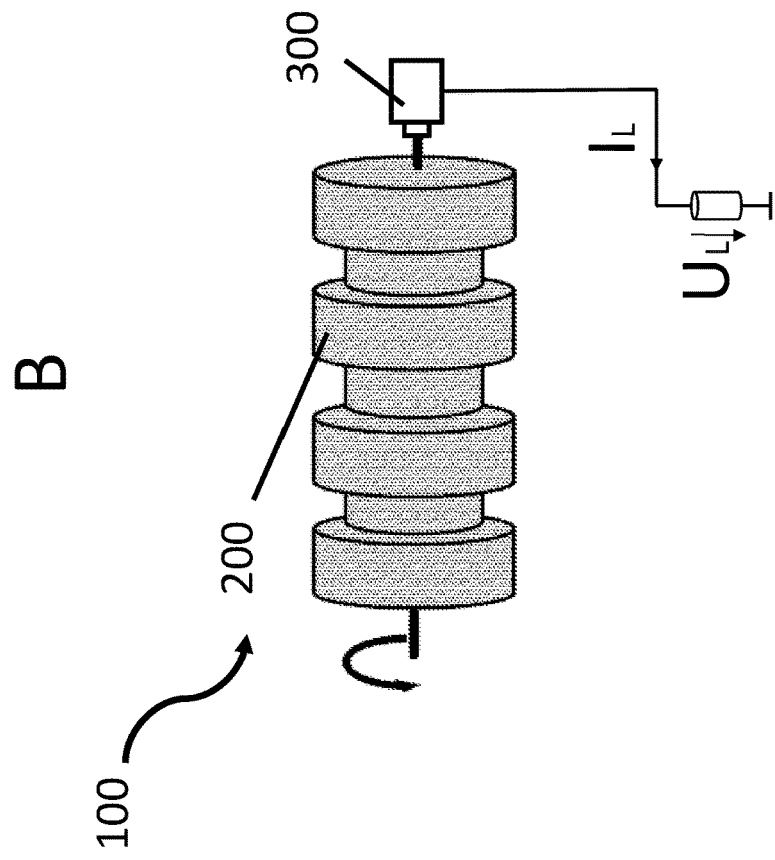
FIG. 1 shows schematically a perspective view of an energy generating device in one embodiment in a vertical and horizontal orientation.
Figure 1:
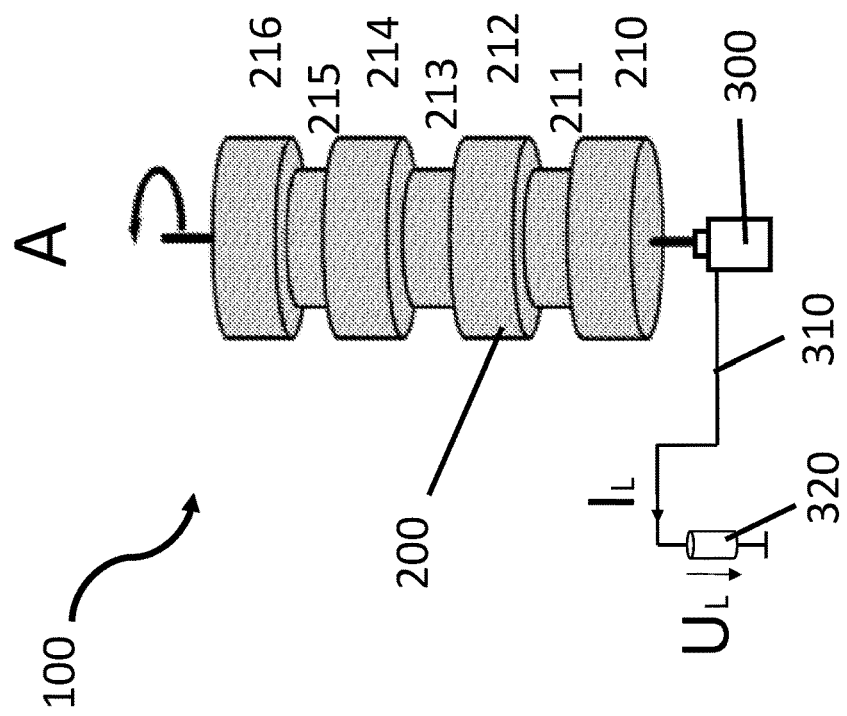
Figure 5B:
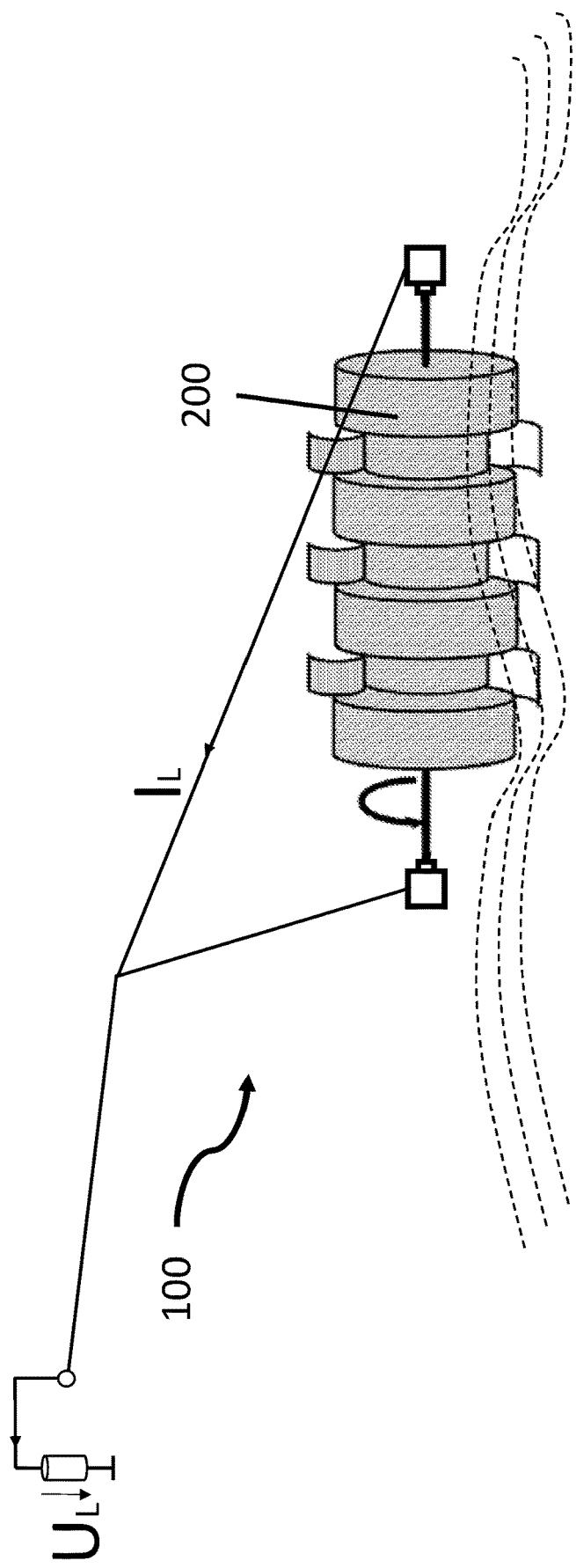
Figure 5C:
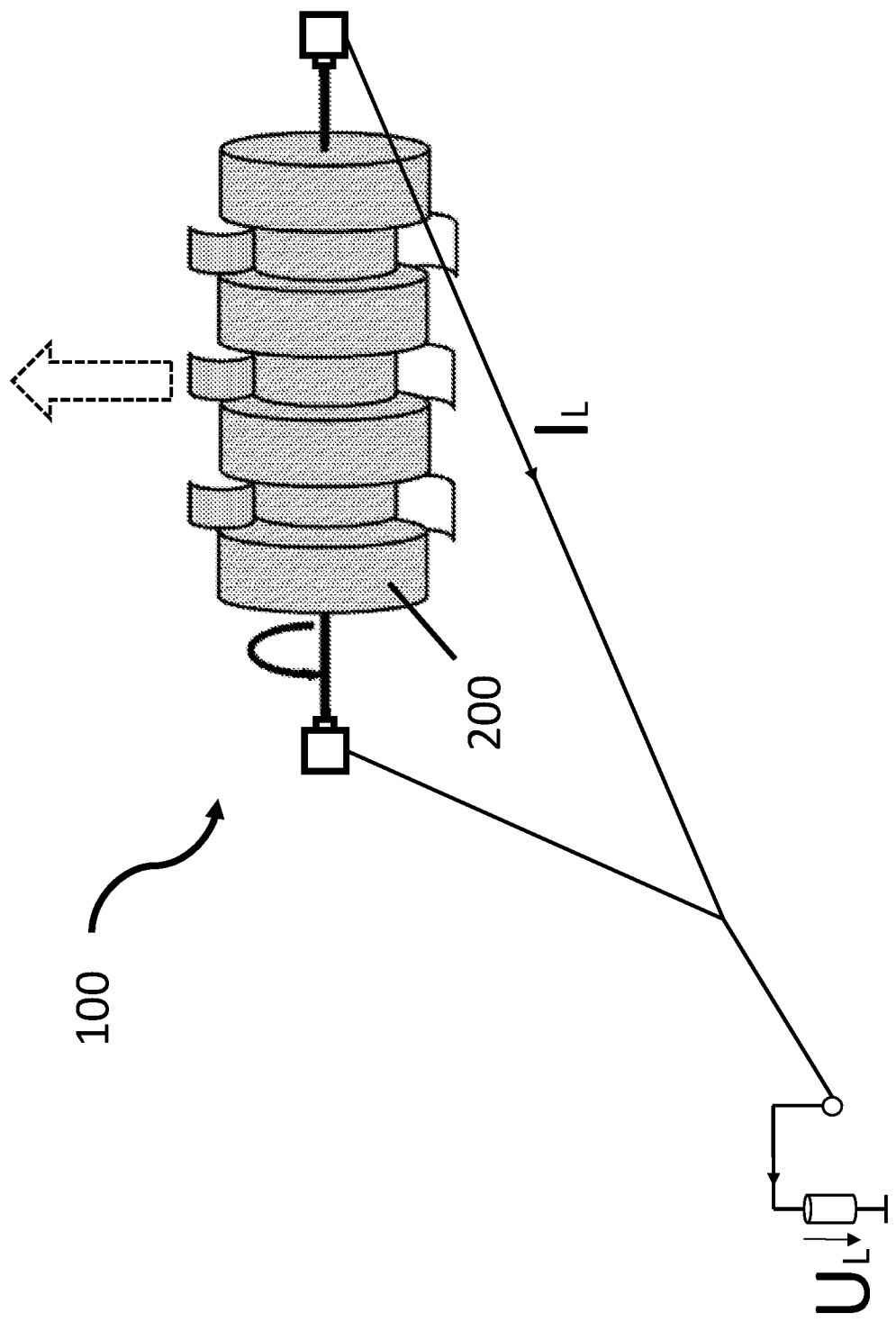

FIG. 1 shows an energy generating device 100, which can be set up for example in a stand operation, a water operation and a flying operation, as shown for example in FIGS. 5A to 5C.

The energy generating device 100 comprises a rotation body 200, which extends along an axis of rotation between a first point and a second point. The axis of rotation here is indicated by a dark arrow and furthermore illustrates the direction of rotation of the rotation body. In view A, the axis of rotation is oriented vertically and in view B the axis of rotation is horizontally oriented. Accordingly, it is proposed and illustrated by FIG. 1 that the energy generating device 100 can be operated both vertically and horizontally or in any other position of the axis.

The rotation body 200 is cylinder-shaped and is formed by a plurality of gas-filled rotation segments, namely, seven rotation segments 210 to 216. The rotation segments 210 to 216 are joined together and arranged along the axis of rotation.

The rotation body 200 is mechanically connected to a generator device 300, the generator device being adapted to produce electric energy obtained from the rotation of the rotation body. The generator device 300 is designed as a dynamo, and the rotation body 200 is fastened to its rotatably mounted shaft. The electric energy produced in the generator 300 can be taken out through an electrical conductor 310, in the form of a voltage UL and a current IL, and stored in an electrical storage or consumer 320.

The rotation body 200 comprises a first rotation segment 210, a second rotation segment 211 and a third rotation segment 212. The second rotation segment 212 is situated between the first 210 and the third rotation segment 212 and has a smaller diameter than the first and third rotation segment 210 and 212.

This arrangement is then repeated in the fourth through seventh segment 213 to 216, so that each time the directly adjacent rotation segments have a different diameter. Thus, by virtue of the different diameters of the rotation segments, a cylinder-shaped tree cake form of the rotation body is produced.

The rotation body 200 is self-supporting and comprises inflatable and gas-filled rotation segments 210 to 216, the pressure in the internal region of the rotation segments being greater than the ambient pressure.

Figure 2:
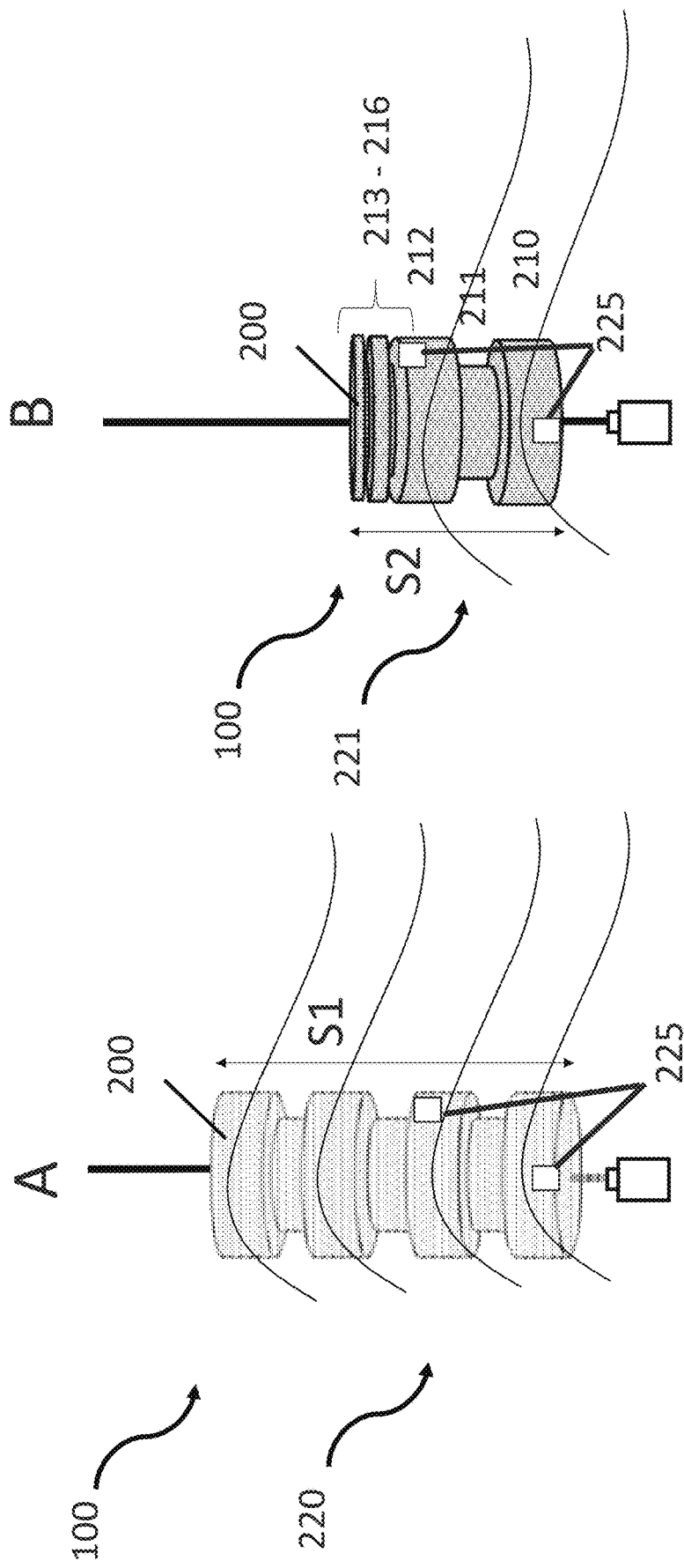
FIG. 2 shows schematically a perspective view of an energy generating device in one embodiment in an unreefed and reefed state.

FIG. 2 shows schematically a perspective view of an energy generating device 100, as shown for example in FIG. 1, in an unreefed state in view A and in a reefed state in view B. Accordingly, FIG. 2 illustrates an energy generating device 100 in two different operating states.

In the left view A of FIG. 2, all of the rotation segments 210 to 216 of the rotation body 200 of the energy generating unit 100 are completely filled with a gas, for example completely filled with air. The gas-filled rotation segments 210 to 216 in view A thus have a greater pressure in their respective internal region than the ambient pressure.

In the right view B, the rotation body 200 is reefed with a reefing means, the reefing means not being represented in FIG. 2. Accordingly, the surface of the rotation body 200 has been decreased with a reefing means in view B, in order to present a smaller surface of attack to the fluid flowing around it. The height of the film elements 213 to 216 has been changed with the reefing means, namely, it has been decreased. For example, gas has been vented from the rotation segments 213 to 216 with a valve system.

The gas-filled rotation segments form a region at least partly surrounded by fluid 220, 221. The region surrounded by fluid is thus a region on a surface of the rotation body 200 or on the surface of the rotation segments at which the fluid comes into contact with the surface and flows along it. The fluid is represented by the wavy lines in FIG. 2 and should illustrate, for example, a wind flow or a portion thereof.

Thanks to the reefing with a reefing means, the length S1 of the rotation body 200 in view A has been changed to the length S2, namely, it has been shortened, as can be seen in view B. Accordingly, a different surface of attack is formed for the fluid flow in the reefed state, the different surfaces of attack being illustrated by the double arrows of different length in FIG. 2, which illustrate at the same time the length of the rotation body. Accordingly, the region surrounded by fluid 220 in view A has been adjusted to a different region surrounded by fluid 221 with the reefing means.

The rotation segments 210 to 216 here are mechanically connected to each other, for example each rotation segment 210 to 216 is mechanically connected by a separation barrier in the internal region of the respective rotation segments to the adjacent rotation segment, so that each rotation segment 210 to 216 forms a closed air or gas chamber, containing trapped gas regardless of the other respective rotation segments. The gas can be vented from the rotation segments 210 to 216 by at least one valve 225, for example each rotation segment 210 to 216 comprises a valve 225.

Because of the special tree cake form which was described above, an especially aerodynamic reefing is provided, since the rotation segments with a larger diameter bear against the rotation segments with the smaller diameter, thus diminishing folds which are detrimental for example to an aerodynamic shape. As shown in FIG. 2 in view B, the rotation segments 216 and 214 bear against the rotation segments 215 and 213, which have a smaller diameter than the rotation segments 215 and 213.

Moreover, rotation segments 210 to 216 are inflatable, at least one rotation segment having a valve 225 for admitting and discharging a gas, for example for admitting and discharging air.

Figure 3A:
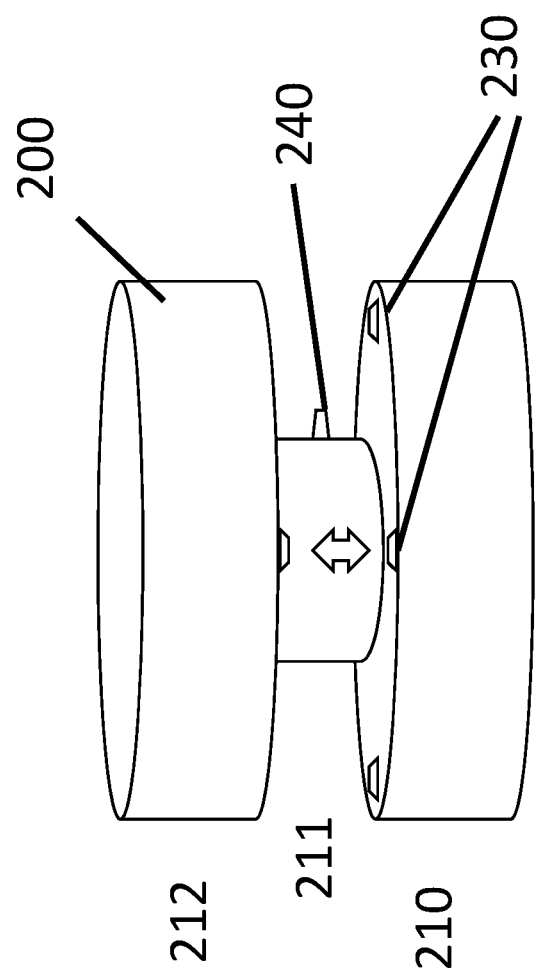
FIGS. 3A and 3B show schematically two embodiments of reefing means.

FIG. 3A shows one embodiment of a reefing means. The rotation body 200 is formed from at least one first, one second, and one third gas-filled rotation segment 210, 211 and 212, the rotation segments being connected to each other and arranged alongside or on top of each other along the axis of rotation. The second rotation segment 211 is arranged between the first and the third rotation segment 210 and 213 and has a smaller diameter than the first and third rotation segment. A tree cake form or dumb bell form is produced.

The rotation body 200 comprises reefing means, with which a region surrounded by fluid of the gas-filled rotation segments 210 to 212 can be adjusted, namely, at least one mechanical connecting means 230, being adapted to connect the first and the third rotation segment 210 and 212 mechanically, the at least one mechanical connecting means 230 being formed from snap buttons engaging with each other. Moreover, the rotation segment 211 comprises a valve system 240, which is adapted to bring about a changing of the region surrounded by fluid by admitting or releasing a gas, i.e., a further reefing means.

Figure 3B:
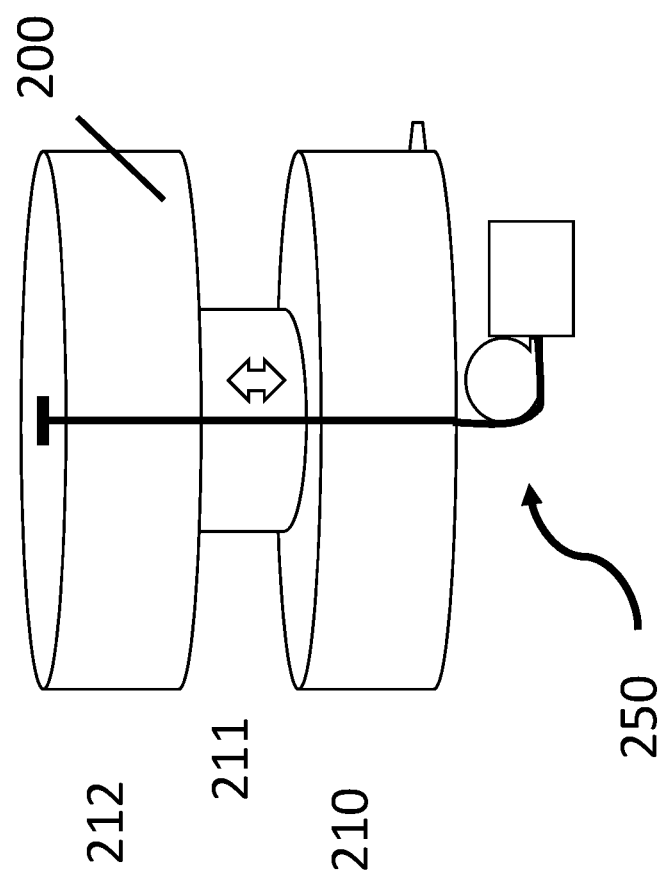

FIG. 3B shows an embodiment of another reefing means, the construction of the rotation body 200 being as was described for FIG. 3A. The reefing means provided here is a traction system 250, which is adapted to compress at least one of the gas-filled rotation segments along the axis of rotation by means of a traction force. In the embodiment shown, the traction system 250 is designed as a cable pull system and it can be combined with the previously described reefing means, as shown in FIG. 3A. The cable pull system 250 comprises a cable element, for example a traction-stable cord, which is fastened at a first end by a fastening element to the element 212. A second end of the cable element is connected to a driven cable winch, in order to exert a traction force on the cable element. If the cable winch winds the cable element up, a traction force will result, which acts on the element 212 through the cable element. Accordingly, the traction system 250 is adapted to compress at least one of the gas-filled rotation segments along the axis of rotation by means of a traction force and thereby perform a reefing.

Figure 4A:
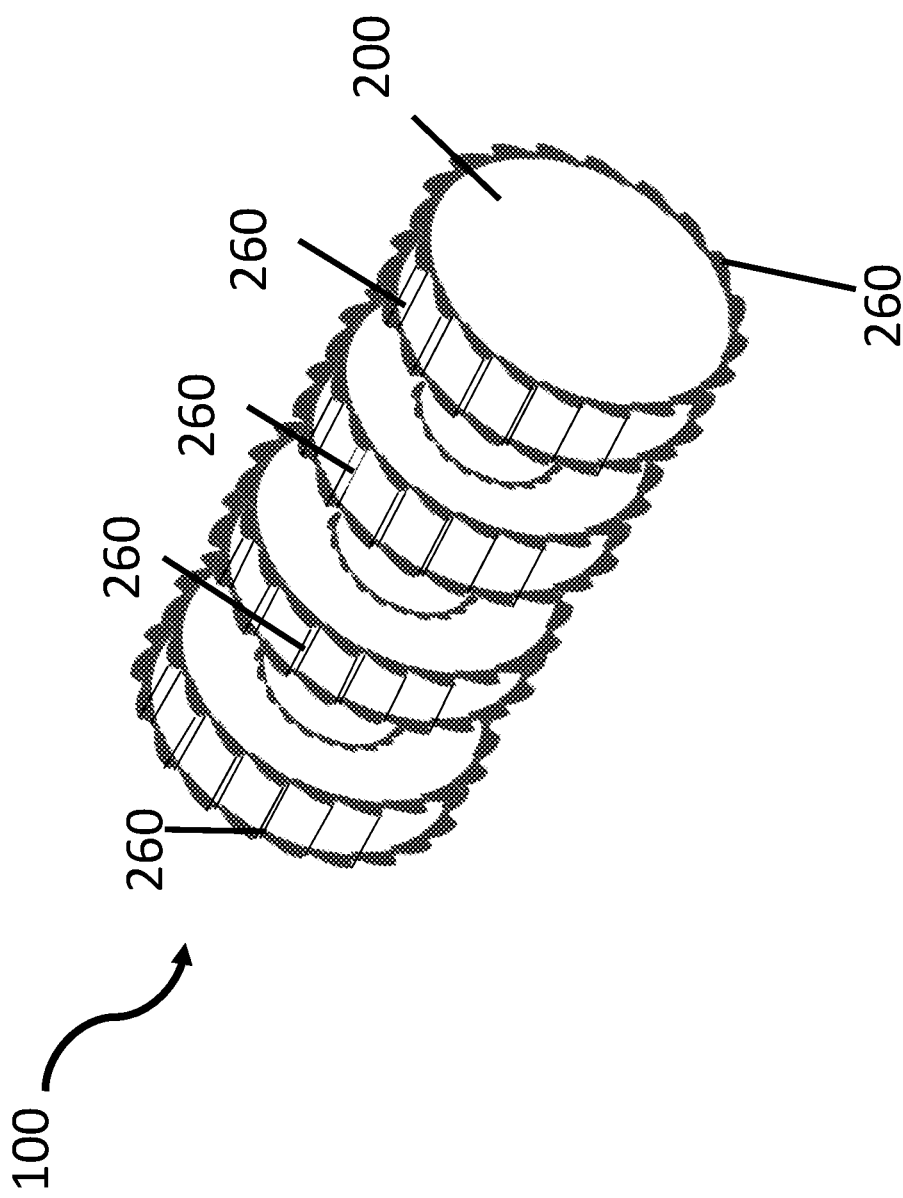

FIG. 4A shows schematically in a side view an energy generating device 100 having a rotation body 200, which comprises a plurality of starting elements 260. The rotation body 200 of the energy generating device 100 is built similar to that described and shown before in FIGS. 1 to 3, namely, in the form of a tree cake with seven rotation segments.

By contrast with the previously shown embodiments, to which reference is made, FIG. 4A illustrates that the rotation body is self-starting in configuration. For this purpose, at least one of the rotation segments, namely all of the rotation segments, comprise at least two starting elements 260 situated opposite in relation to the axis of rotation for increasing the fluid resistance in the region surrounded by the fluid. In FIG. 4A, a plurality of starting elements are shown arranged about the entire periphery of the at least one rotation segment. All seven of the rotation segments have a plurality of starting elements.

FIG. 4B shows schematically in a side view an energy generating device 100 having a rotation body 200, which comprises a plurality of starting elements 260, 261, i.e., for example, the energy generating device of FIG. 4A in a side view. The starting elements 260, 261 here each have one side facing the fluid 262 and one side facing away from the fluid 263, the side facing the fluid having a larger fluid resistance than the side facing away from the fluid. In this way, even if a fluid flow strikes the rotation body evenly and to the full extent, a self-starting of the energy generating device 100 will be provided due to the different fluid resistance in combination with the rotational mounting of the rotation body 200.

FIGS. 5A to 5C show three different kinds of operation of an energy generating device 100, namely, a stand operation in FIG. 5A, a water operation in FIG. 5B and a flying operation in FIG. 5C, as previously described for FIGS. 1 to 4.

In FIG. 5A, the energy generating device 100 is set up in the floor operation and it has a vertical axis of rotation. The generator device 300 comprises a rotating part and a stationary part, the rotating part being mechanically connected to the rotation body 200, namely, by a shaft, and the stationary part comprises a fastening means 330 for fastening to a floor structure.

One suitable location for installing the stand operation can be for example a boat or ship, the bow of which is shown schematically in FIG. 5A. Now, if the wind is blowing and it strikes the energy generating device, the system will generate energy in the form of electric energy, as described previously. The energy generating device 100 comprises six pairwise oppositely arranged starting elements for a self-starting, having a wing-like configuration, and being designed and functioning as starting elements in the manner described in FIGS. 4A and 4B. The energy generating device 100 accordingly generates, besides electric energy, also a propulsive force by virtue of the Magnus effect.

In FIG. 5B, the energy generating device 100 is set up in the water operation and it has a horizontal axis of rotation. The generator device 300 is attached by a cable system to a fixation point, in order to secure the energy generating device 100 at a fixed point, for example, on a boat or ship. Moreover, the generator device 300 is formed with two encapsulated generators and thus it is waterproof. If water flows along the region surrounded by fluid, the energy generating device 100 will begin to generate energy from the water flow. This effect is assisted by the wing-shaped starting elements. Accordingly, the energy generating device 100 is also provided for the water operation and it can produce electric energy from a river or ocean current. It is understood that, by virtue of the gas-filled rotation segments, the rotation body has enough buoyancy for a water operation, i.e., it will not sink.

In FIG. 5C, the energy generating device 100 is set up in the flying operation and it has a vertical axis of rotation. For this purpose, the rotation segments of the rotation body 200 are made of a tough lightweight film, and the components of the rotation body are designed so that a flying operation can be established with the rotation body. In the flying operation, it can be provided that at least one of the rotation segments is filled with a gas whose density is less than that of air, for example with helium, in order to generate a sufficiently large lifting force, which is greater than the countervailing weight force. A generator device mechanically connected to the rotation body, comprising two generators 300, produces electric energy, which is taken away by the electrical conductor. The generator device thus has a rotating part and a stationary part, the rotating part being connected mechanically to the rotation body, namely, directly connected, and the stationary part having fastening means for attachment to a cable system. The generator device is adapted to produce electric energy which is obtained directly from the rotation of the rotation body.

Preferably a tear-resistant mooring cable will be fastened to the fastening means, preferably comprising an electrical conductor or being an electrical conductor, in order to take away the energy produced.

In an additional or alternative embodiment, not represented in FIG. 5C, the generator device 300 is connected mechanically by a traction cable system to the rotation body 200, in order to produce electrical energy from a lifting force and/or propulsive force arising due to the rotation of the rotation body.

It is thus proposed to produce energy additionally or alternatively with a generator, which is connected by a traction cable system having one or more tear-resistant cables to the rotation body 200, i.e., not arranged directly on the rotation body 200, for example, on a floor station. In other words, it is proposed that the rotation body 200 is used as a towing kite, i.e., while the rotation body 200 rises by virtue of a lifting force, a generator is driven by a cable winch. If the full cable length is reached, the rotation body will be reefed, so that it will sink and the cable can be retrieved again in order to then commence the energy production process once again. The lifting force of the rotation body 200 is attributable to the rotation of the rotation body 200, which is produced by the Magnus effect, the principle of which is basically known from Flettner rotors. The described generator device is accordingly adapted to producing electric energy obtained directly from the rotation of the rotation body. This generator device can also find use with a traction cable system on the water for energy transformation into photoelectric or thermal energy.

Figure 6:
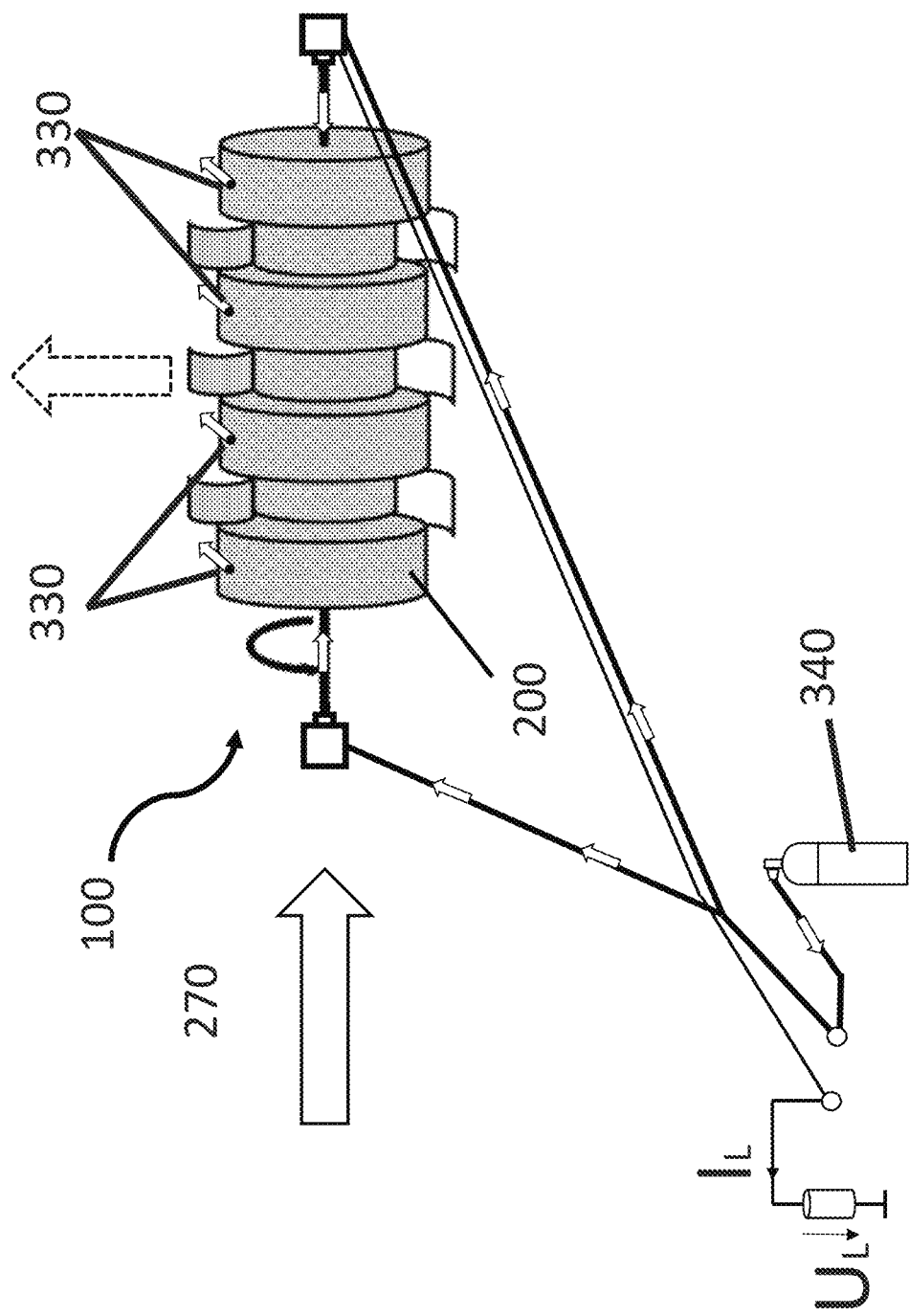
FIG. 6 shows schematically another embodiment of an energy generating device having a rotation generating means.

In FIG. 6 the energy generating device 100 is set up in the flying operation and it has a vertical axis of rotation. By contrast with FIG. 5C, to which reference is made, the rotation body 200 comprises a rotation generating means 330, in order to place the rotation body 200 in a given rotation or maintain it in rotation, the rotation generating means 330 being adapted to produce a rotational angular momentum of the rotation body. As the rotation generating means 330, there are shown in FIG. 6 directional film nozzles, indicated by darks points with an arrow emerging from them, which discharge an excess pressure generated from an internal region of a rotation segment. The necessary excess pressure can for example come from a compressed air generating unit 340, which is shown as a compressed air cylinder in FIG. 6. The path of the compressed air is represented by the small light arrows.

In addition, a compressed air nozzle can be provided, which drives the rotation body 200 directly through an impeller, not shown in FIG. 6. Neither are the stability and fluid tracking devices shown.

Summarizing, an energy generating device is thus proposed which utilizes various physical effects, namely, the Magnus, Darrieus, and Savonius effect, which are generally known. The proposed energy generating device has a number of benefits, some of which are summarized as follows:

- a multifunctional wind plant and/or water power plant is provided for energy generation of electricity, light, heat, and so forth, which is also suitable as a propulsion plant for the movement of ships or other vehicles;
- diversified applications are made possible by the ability to change the size and shape of the energy generating device and to place the energy generating device horizontally or vertically or in another spatial position;

independent set-up and tear-down and relatively easy transport; and the risk of capsizing boats or ships can be reduced if an energy generating device is used as proposed when the wind picks up.

The invention claimed is:

1. An energy generating device for generating energy from a flowing fluid, comprising:
   a rotation body, wherein:
   the rotation body extends along an axis of rotation between a first point and a second point;
   the rotation body is adapted to rotate about the axis of rotation; and
   the rotation body is formed from at least a first, a second, and a third rotation segment, wherein:
   the rotation segments are joined together;
   the rotation segments are arranged along the axis of rotation; and
   the rotation segments form a region at least partly surrounded by fluid, wherein:
   the second rotation segment is situated between the first rotation segment and the third rotation segment and has a different diameter than the first rotation segment and third rotation segment; and
   a generator device mechanically connected to the rotation body, wherein the generator device is adapted to generate energy which is produced from the rotation of the rotation body,
   wherein the rotation body comprises a rotation generating means for placing and keeping the rotation body in a predetermined rotation, wherein the rotation generating means is adapted to bring about a rotational angular momentum of the rotation body, and the rotation generating means is:
   a directional segment nozzle, which releases a generated excess pressure from an internal region of a rotation segment; and/or
   a compressed air nozzle or hot air nozzle, which drives the rotation body mechanically with a generated excess pressure,
   wherein:
   the generated excess pressure is generated with a compressed air generating unit or a heat generating unit, wherein the heat or compressed air generating unit is integrated in the rotation body or connected to the rotation generating means by a compressed air line; and/or
   the generated excess pressure is generated with a solar pressure generating unit, which produces an excess pressure by heating, wherein ambient air flowing into an internal region of the rotation segments is heated, and the rotation body or the rotation segments are formed with a transparent film, in order to introduce light in an internal region of the rotation body or of one or more rotation segments, and wherein a light-absorbing region is provided in the internal region, which absorbs the light so introduced and becomes heated, and ambient air flows from an inlet to an outlet along the light-absorbing region in order to produce the excess pressure by an expansion of the ambient air due to heating in the internal region of the rotation body.

2. The energy generating device according to claim 1, wherein:
   the first rotation segment has a first diameter;
   the second rotation segment has a second diameter; and
   the third rotation segment has a third diameter, wherein:
   the first diameter is larger than the second diameter and the third diameter corresponds to the first diameter, so as to form a cylinder-shaped tree cake form of the rotation body; and/or
   the first diameter is smaller than the second diameter and the third diameter corresponds to the first diameter, so as to form an elliptical shape or flat diamond shape of the rotation body; and/or
   the first diameter is larger than the second diameter and the second diameter is larger than the third diameter, so as to form a conical shape of the rotation body; and/or
   the rotation segments are shaped as rings, so that the rotation body is hollow and there is formed an open barrel shape, wherein the ring-shaped rotation segments are mounted rotatably about the axis of rotation by a supporting structure.

3. The energy generating device according to claim 1, wherein:
   the rotation body is self-starting; and
   at least one rotation segment comprises at least two starting elements situated opposite in relation to the axis of rotation for increasing the fluid resistance in the region surrounded by fluid, wherein the at least one rotation segment comprises a plurality of starting elements arranged over the entire circumference of the at least one rotation segment, and:
   the starting elements have one side facing the fluid and one side facing away from the fluid, the side facing the fluid having a larger fluid resistance than the side facing away from the fluid.

4. The energy generating device according to claim 1, wherein:
   the rotation body is reefable; and
   at least one of the rotation segments is gas-filled and a higher pressure is present in an inner region of the at least one gas-filled rotation element in an unreefed state than the ambient pressure and a reefing is accomplished by gas exchange; and/or
   at least one of the rotation segments is filled with a memory foam, which is uncompressed in an unreefed state and strives for the uncompressed state when a force is applied to the memory foam by a reefing means; and/or
   at least one of the rotation segments is formed with a foldable and elastic lattice structure, which is uncompressed in an unreefed state and strives for the uncompressed state when a force is applied to the lattice structure by a reefing means.

5. The energy generating device according to claim 1, wherein:
   a reefing means is arranged on the rotation body, with which the region surrounded by fluid of the rotation segments can be adjusted.

6. The energy generating device according to claim 5, wherein the reefing means is a reefing means from the list of reefing means comprising:
   a mechanical connecting means, which is adapted to mechanically connect rotation segments;
   a valve system, which is adapted to produce a change in the region surrounded by fluid by means of admitting or venting a gas; and
   a traction system which is adapted to compress at least one of the rotation segments along the axis of rotation by means of a traction force provided by a cable pull system or a rod system.

7. The energy generating device according to claim 1, wherein:
 at least one of the rotation segments is gas-tight and filled with a gas the density of which is less than that of air in order to generate a lifting force of the rotation body and establish a flying operation.

8. The energy generating device according to claim 7, wherein the gas is helium gas.

9. The energy generating device according to claim 1, wherein:
 the rotation segments are inflatable and at least one rotation segment has a valve for admitting and discharging a gas.

10. The energy generating device according to claim 9, wherein each rotation segment has a valve for admitting and discharging a gas and the gas is air or helium.

11. The energy generating device according to claim 1, wherein:
 the components of the rotation body are designed such that a flying operation and a water operation can be established with the rotation body,
  the rotation segments of the rotation body are made of durable lightweight film material; and/or
  the generator device is encapsulated.

12. The energy generating device according to claim 1, wherein:
 the energy generating device further comprises a fluid tracking device, which is adapted to make the rotation body track a variable fluid flow; and/or
 the energy generating device comprises a stabilization device, which is adapted to maintain the rotation body stable in motion in the fluid flow.

13. The energy generating device according to claim 12, wherein the fluid tracking device is a wind tracking device.

14. The energy generating device according to claim 1, wherein:
 the generator device comprises a rotating part and a stationary part, wherein the rotating part is mechanically connected to the rotation body and the stationary part comprises a fastener for securing to a floor structure or to a cable system; and/or
 the generator device is mechanically connected by a traction cable system to the rotation body in order to produce electric energy from a lifting force and/or propulsive force produced by the rotation of the rotation body.

15. The energy generating device according to claim 1, wherein:
 the generator device is permanently excited in design and is adapted to put out a generated current to an electrical terminal, and the generator is designed as an external rotor.

16. A rotation body for an energy generating device for generating energy from a flowing fluid, wherein the rotation body extends along an axis of rotation between a first point and a second point and the rotation body is adapted to rotate about the axis of rotation and the rotation body is formed from at least a first, a second, and a third rotation segment, wherein the rotation segments are joined together and arranged along the axis of rotation, and they form a region at least partly surrounded by fluid, wherein the second rotation segment is situated between the first and the third rotation segment and has a different diameter than the first and third rotation segment to form a cylinder-shaped tree cake form or a spherical shape or a conical shape of the rotation body,
 wherein the rotation body comprises a rotation generating means for placing and keeping the rotation body in a predetermined rotation, wherein the rotation generating means is adapted to bring about a rotational angular momentum of the rotation body, and the rotation generating means is:
  a directional segment nozzle, which releases a generated excess pressure from an internal region of a rotation segment; and/or
  a compressed air nozzle or hot air nozzle, which drives the rotation body mechanically with a generated excess pressure,
 wherein:
  the generated excess pressure is generated with a compressed air generating unit or a heat generating unit, wherein the heat or compressed air generating unit is integrated in the rotation body or connected to the rotation generating means by a compressed air line; and/or
  the generated excess pressure is generated with a solar pressure generating unit, which produces an excess pressure by heating, wherein ambient air flowing into an internal region of the rotation segments is heated, and the rotation body or the rotation segments are formed with a transparent film, in order to introduce light in an internal region of the rotation body or of one or more rotation segments, and wherein a light-absorbing region is provided in the internal region, which absorbs the light so introduced and becomes heated, and ambient air flows from an inlet to an outlet along the light-absorbing region in order to produce the excess pressure by an expansion of the ambient air due to heating in the internal region of the rotation body.

\* \* \* \* \*